(12) United States Patent
Takiguchi et al.

(10) Patent No.: US 10,668,857 B2
(45) Date of Patent: Jun. 2, 2020

(54) REFLECTOR, INFORMATION DISPLAY APPARATUS, AND MOVABLE BODY

(71) Applicant: SONY CORPORATION, Tokyo (JP)

(72) Inventors: Mikio Takiguchi, Kanagawa (JP); Tomoki Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/328,721

(22) PCT Filed: Jul. 27, 2017

(86) PCT No.: PCT/JP2017/027217
§ 371 (c)(1),
(2) Date: Feb. 26, 2019

(87) PCT Pub. No.: WO2018/061444
PCT Pub. Date: Apr. 5, 2018

(65) Prior Publication Data
US 2019/0210526 A1    Jul. 11, 2019

(30) Foreign Application Priority Data

Sep. 30, 2016  (JP) .................. 2016-194049

(51) Int. Cl.
*G02B 27/01* (2006.01)
*G02B 5/09* (2006.01)
*B60R 1/00* (2006.01)
*B60K 35/00* (2006.01)
(Continued)

(52) U.S. Cl.
CPC .............. *B60R 1/00* (2013.01); *B60K 35/00* (2013.01); *B60R 11/02* (2013.01); *G02B 5/09* (2013.01);
(Continued)

(58) Field of Classification Search
CPC ........ G02B 27/0101; G02B 2027/0132; G02B 2027/0123; G02B 2027/0125;
(Continued)

(56) References Cited

U.S. PATENT DOCUMENTS

| 2013/0120825 A1 | 5/2013 | Lambert et al. |
| 2015/0198802 A1 | 7/2015 | Ando et al. |
| 2016/0085084 A1* | 3/2016 | Masson ............... G02B 5/0215 359/633 |

FOREIGN PATENT DOCUMENTS

| AT | 30788 T | 11/1987 |
| DE | 3338967 A1 | 5/1985 |

(Continued)

OTHER PUBLICATIONS

International Search Report and Written Opinion of PCT Application No. PCT/JP2017/027217, dated Oct. 17, 2017, 08 pages of ISRWO.

*Primary Examiner* — Ryan D Howard
(74) *Attorney, Agent, or Firm* — Chip Law Group

(57) ABSTRACT

A movable body according to an embodiment of the present disclosure includes a vehicle body and an information display apparatus mounted on the vehicle body. The information display apparatus provided at the movable body includes a light projecting part that projects a luminous flux and a reflector that reflects the luminous flux from the light projecting part. The reflector includes a plurality of unit regions two-dimensionally arranged over a main surface. Each of the unit regions includes a plurality of reflecting surfaces two-dimensionally arranged, and splits a luminous flux entering the plurality of reflecting surfaces to perform reflection in a plurality of directions.

9 Claims, 13 Drawing Sheets

(51) Int. Cl.
*G06F 3/01* (2006.01)
*G02B 27/14* (2006.01)
*B60R 11/02* (2006.01)
*G02B 30/40* (2020.01)
*G06K 9/00* (2006.01)

(52) U.S. Cl.
CPC ....... *G02B 27/0101* (2013.01); *G02B 27/143* (2013.01); *G02B 30/40* (2020.01); *G06F 3/013* (2013.01); *B60K 2370/155* (2019.05); *B60K 2370/334* (2019.05); *B60K 2370/52* (2019.05); *B60R 2300/107* (2013.01); *B60R 2300/202* (2013.01); *B60R 2300/802* (2013.01); *G06K 9/00791* (2013.01)

(58) Field of Classification Search
CPC .. G02B 2027/0134; G02B 5/09; B60K 35/00; B60K 37/02; H04N 9/3132; H04N 9/3129
See application file for complete search history.

(56) References Cited

FOREIGN PATENT DOCUMENTS

| | | |
|---|---|---|
| EP | 0144611 A1 | 6/1985 |
| EP | 2728395 A1 | 5/2014 |
| JP | 60-103324 A | 6/1985 |
| JP | 07-156685 A | 6/1995 |
| JP | 07-228172 A | 8/1995 |
| JP | 2005-199934 A | 7/2005 |
| JP | 2010-070117 A | 4/2010 |
| JP | 2010-156929 A | 7/2010 |
| JP | 2012-039397 A | 2/2012 |
| JP | 2013-171252 A | 9/2013 |
| JP | 2013-254031 A | 12/2013 |
| KR | 10-2015-0003906 A | 1/2015 |
| WO | 2013/183253 A1 | 12/2013 |

* cited by examiner

[FIG. 1]
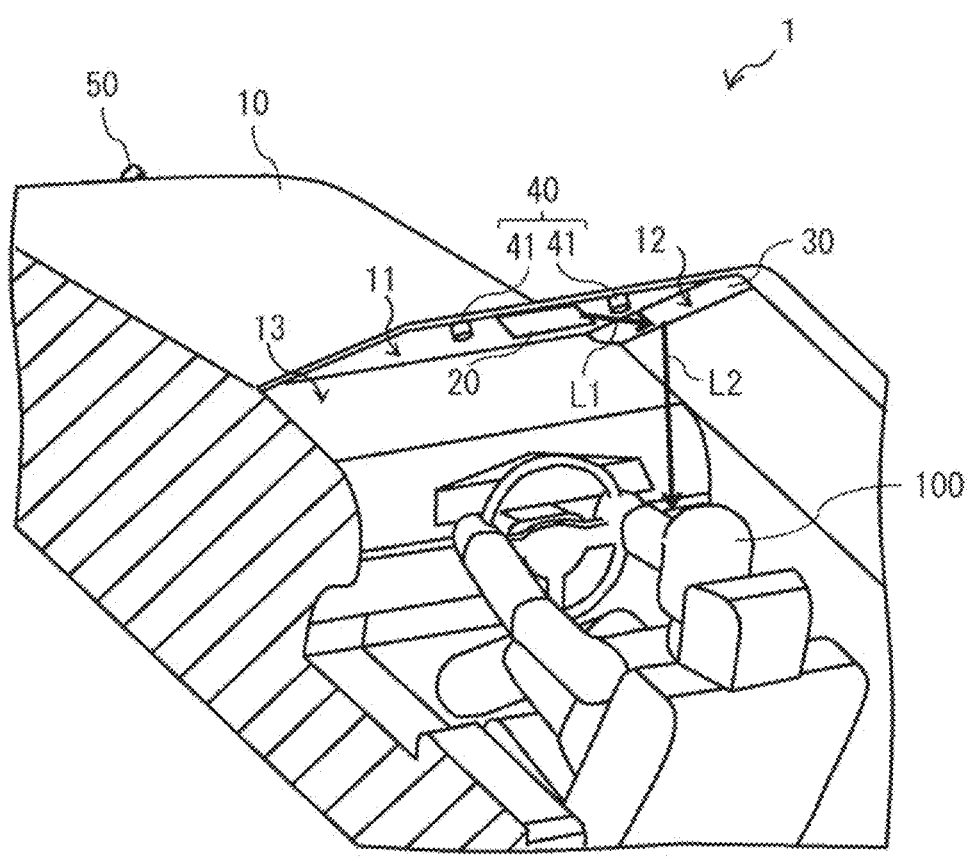

[FIG. 2]
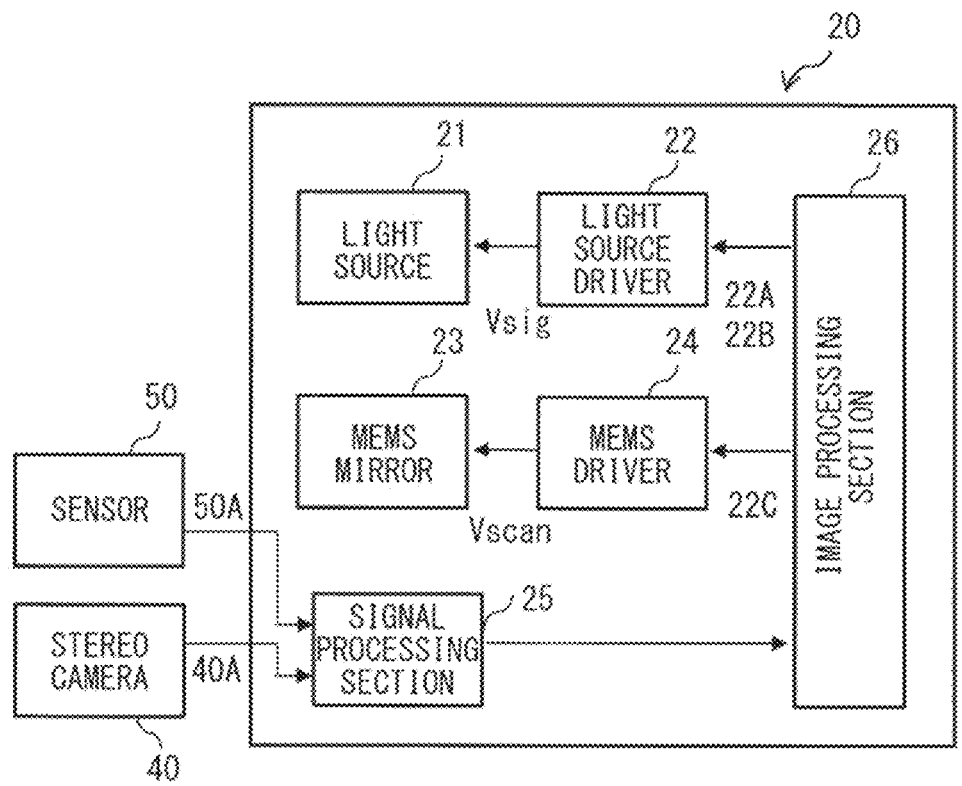
[FIG. 3]
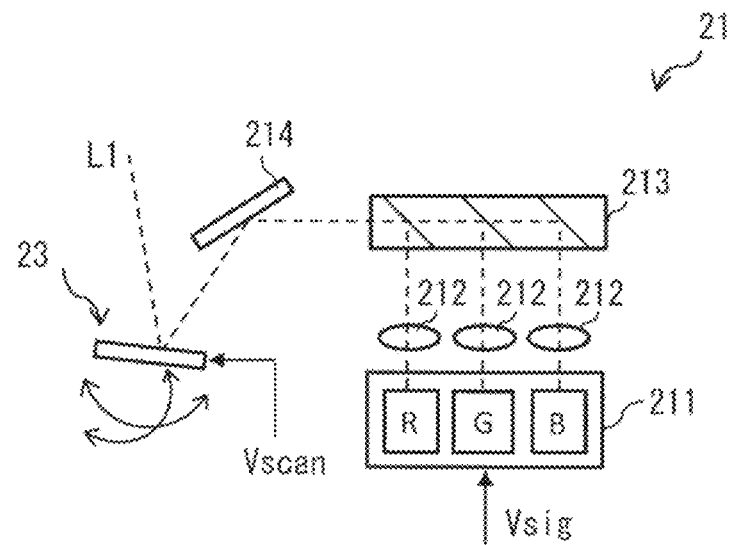

[FIG. 4]
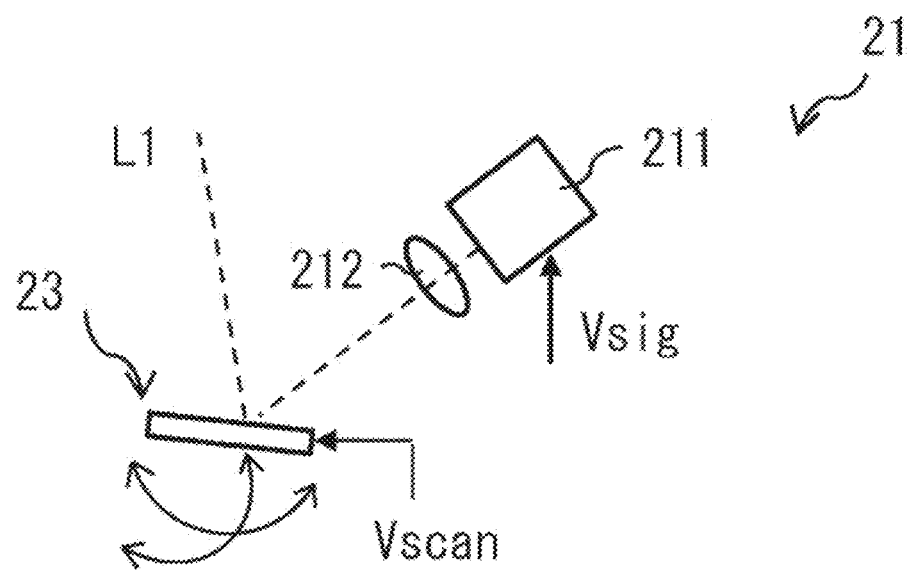
[FIG. 5]
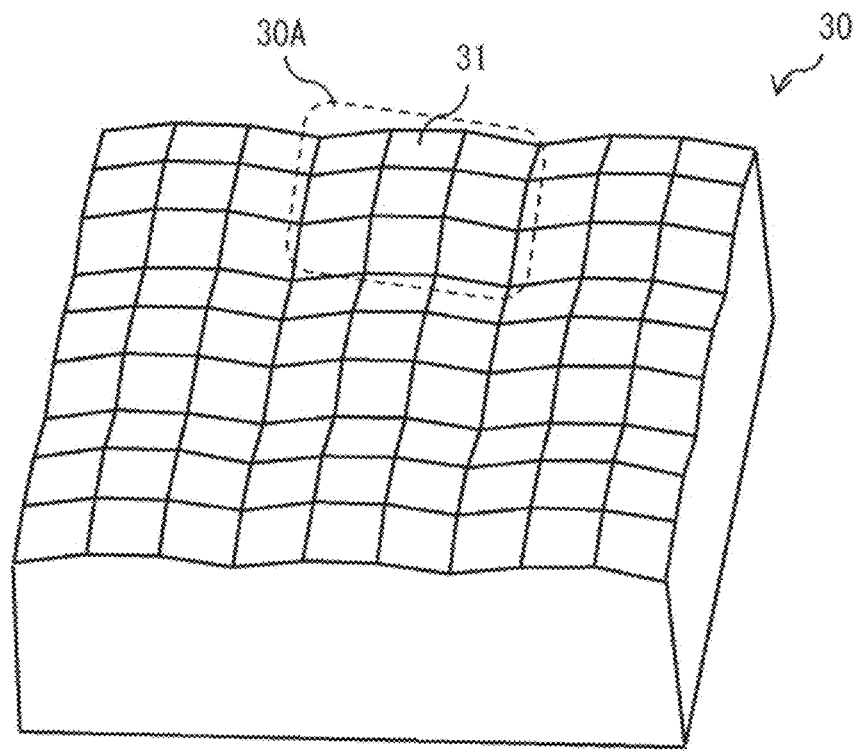

[FIG. 6]
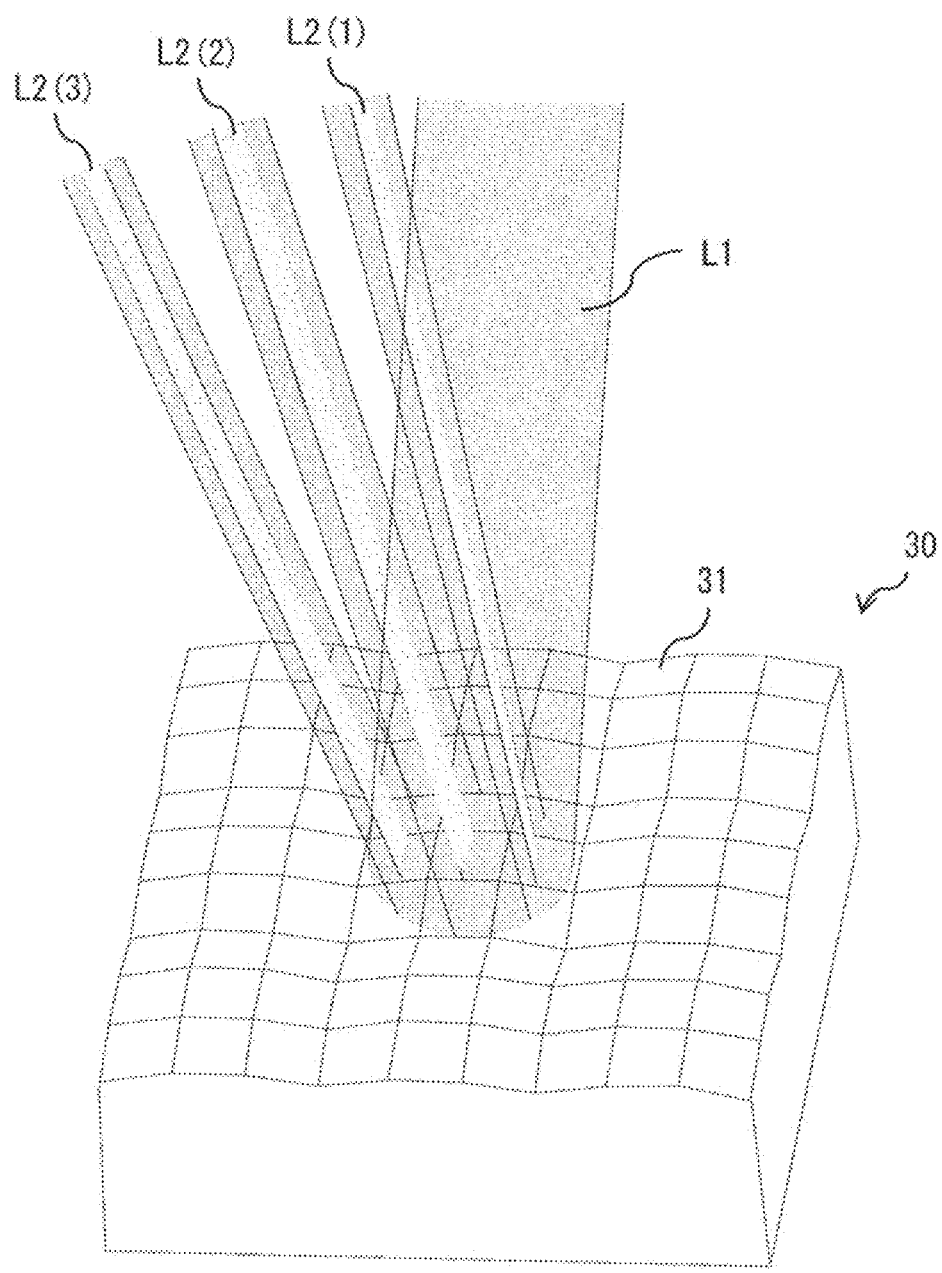

[FIG. 7]
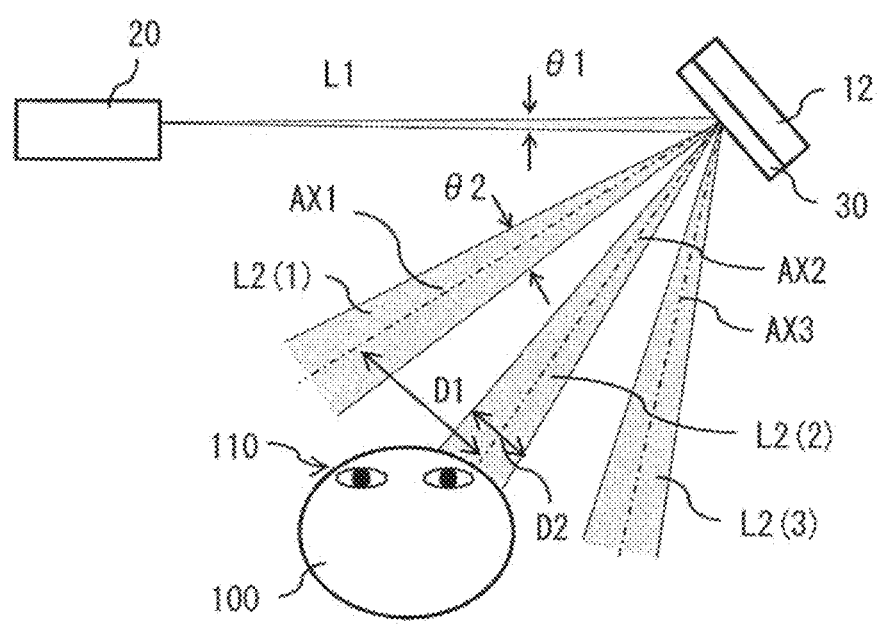

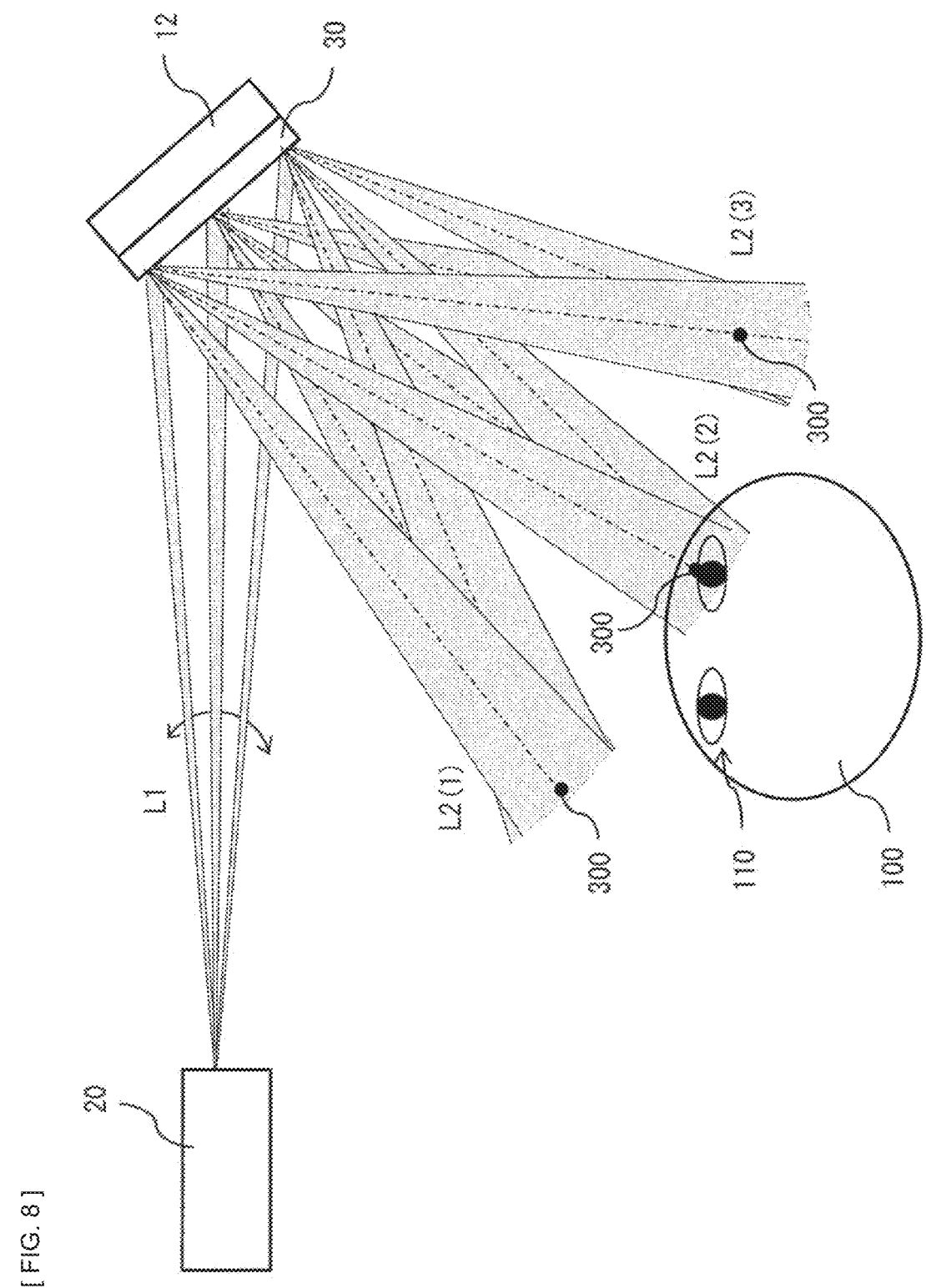

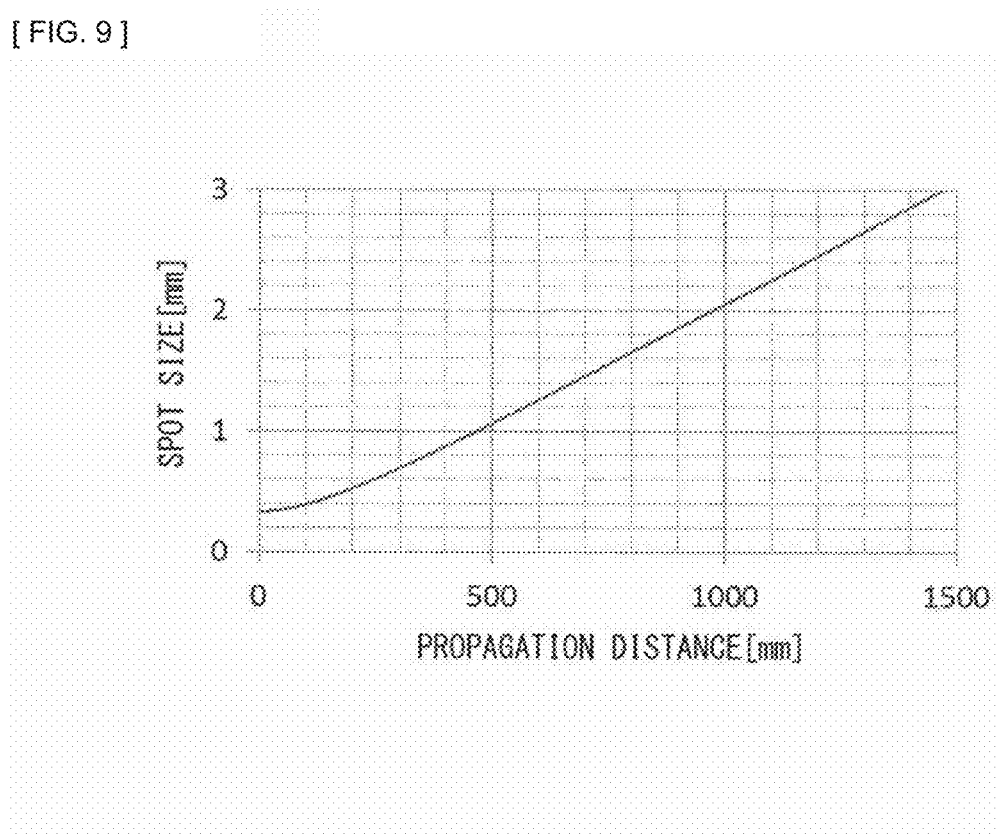
[FIG. 9]

[FIG. 10]
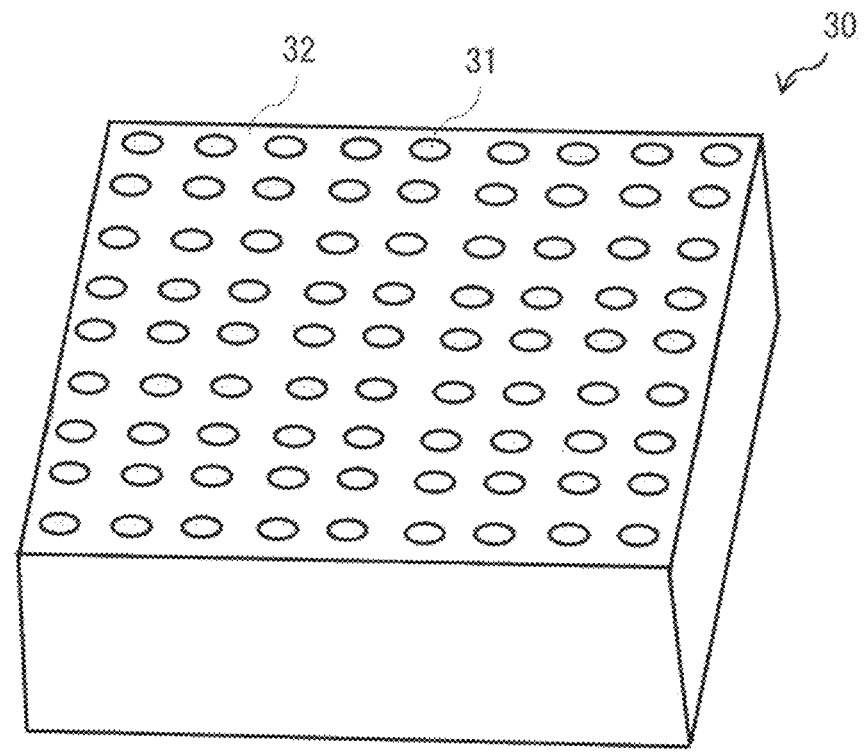
[FIG. 11]
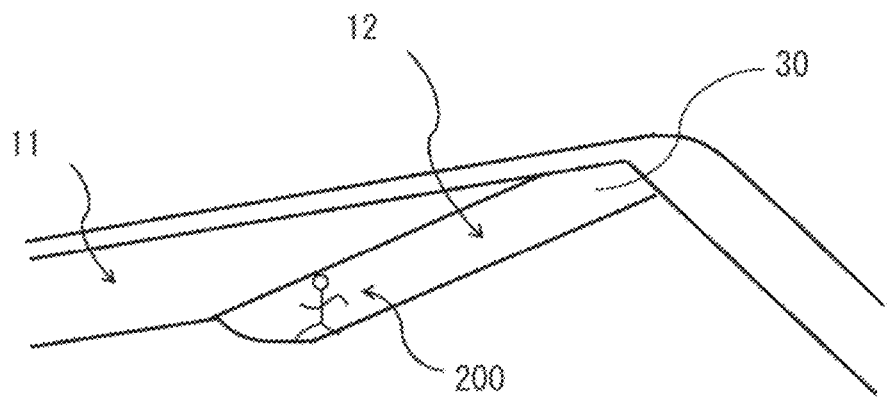

[FIG. 12]
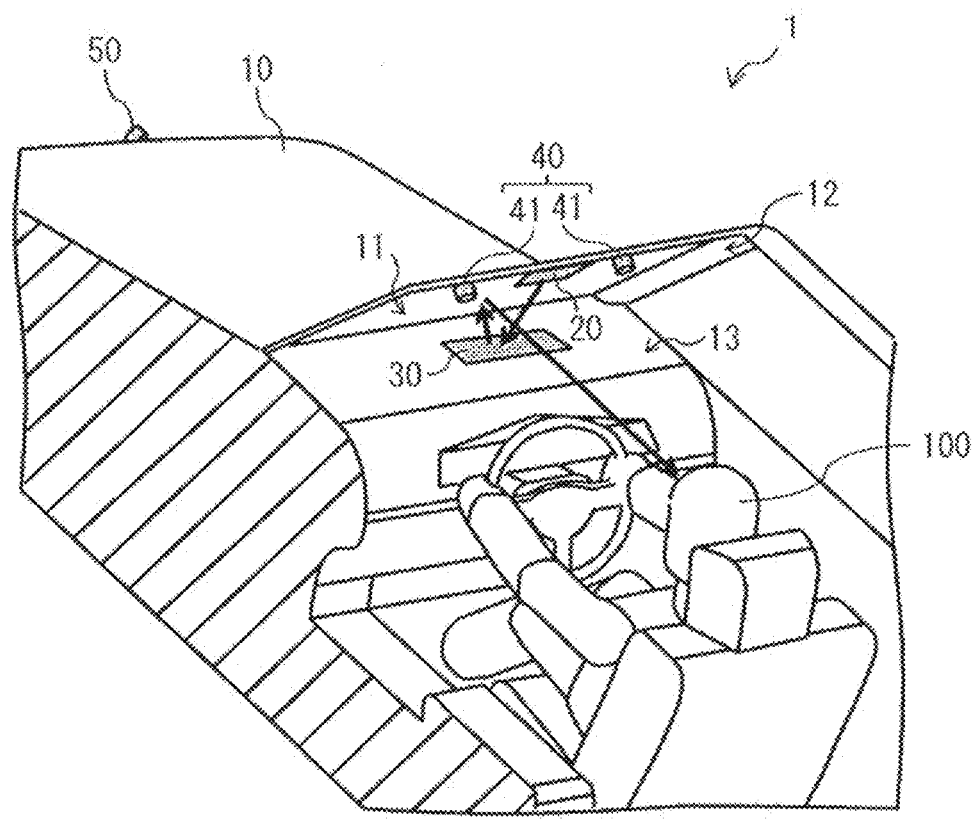
[FIG. 13]
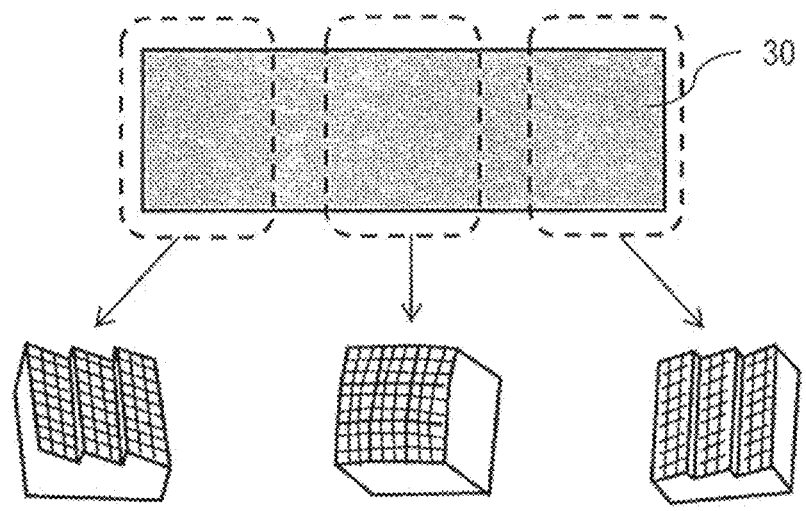

[ FIG. 14 ]
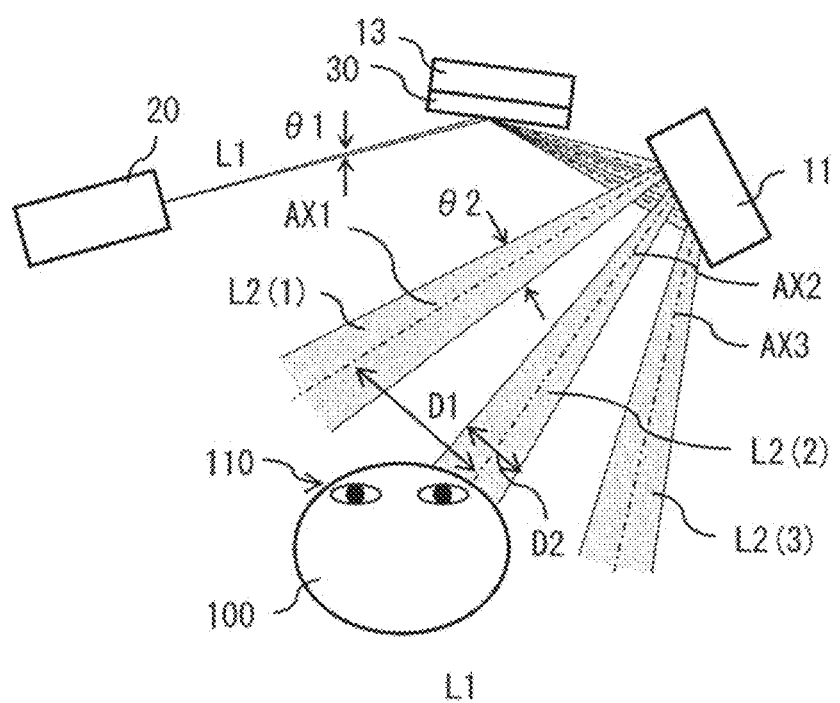

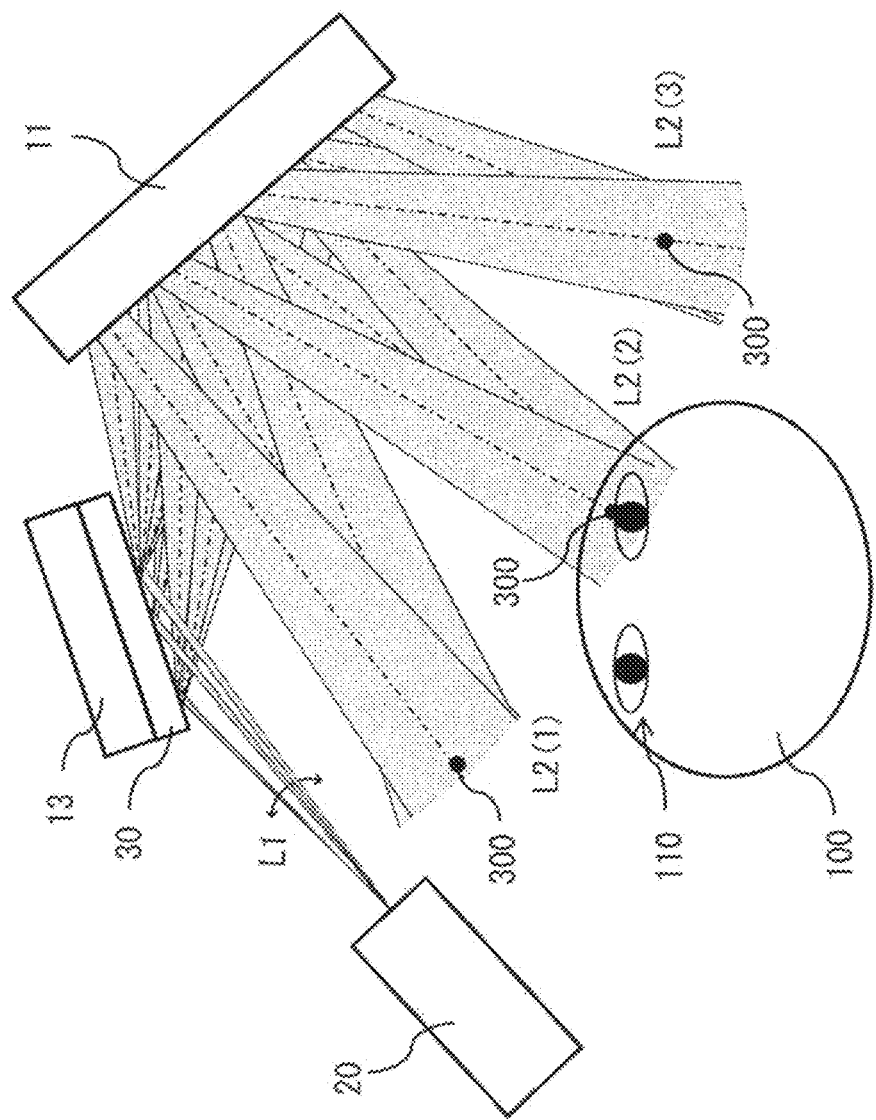
[FIG. 15]

[ FIG. 16 ]
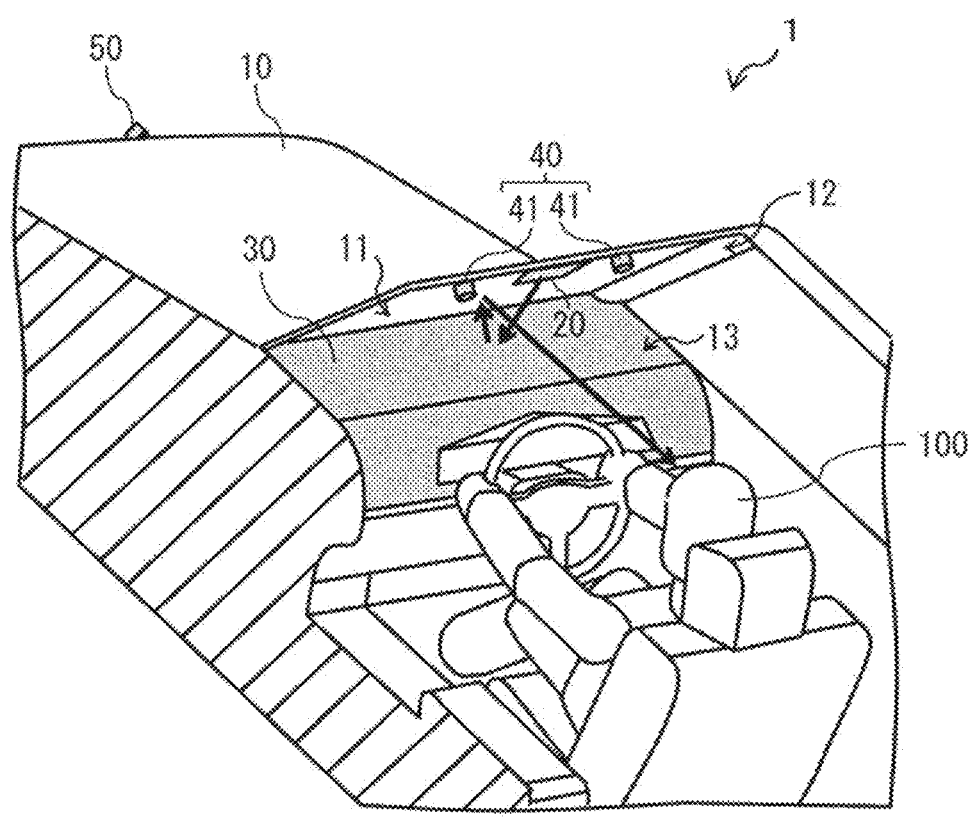

[ FIG. 17 ]
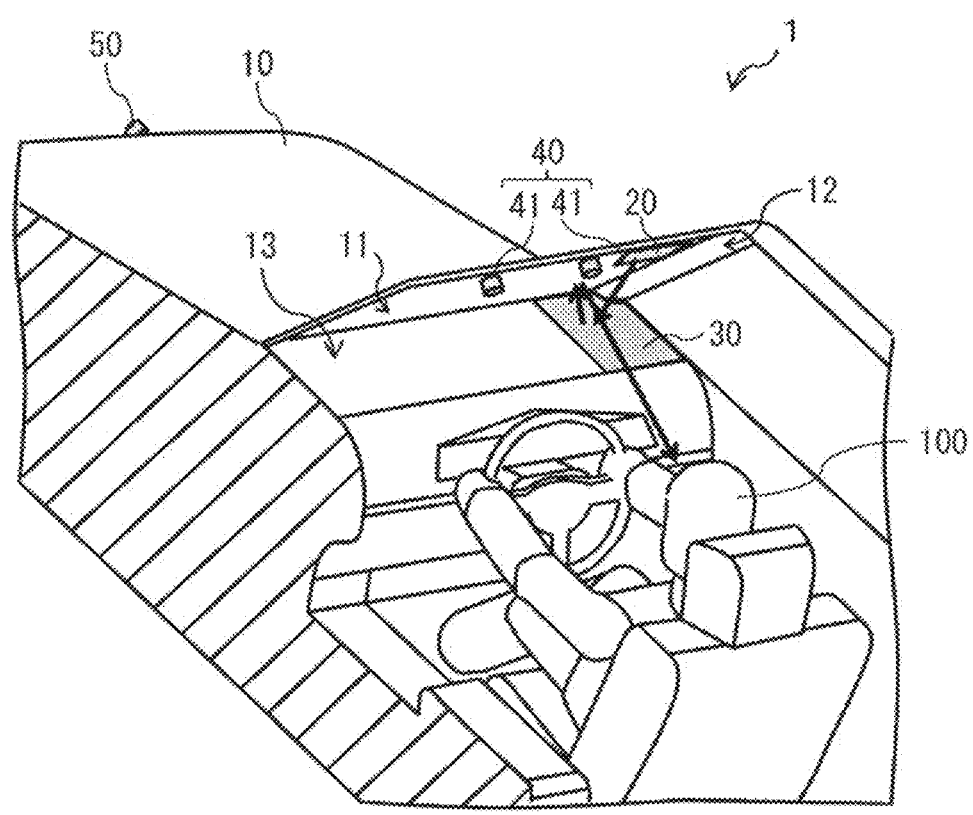

REFLECTOR, INFORMATION DISPLAY APPARATUS, AND MOVABLE BODY

CROSS REFERENCE TO RELATED APPLICATIONS

This application is a U.S. National Phase of International Patent Application No. PCT/JP2017/027217 filed on Jul. 27, 2017, which claims priority benefit of Japanese Patent Application No. JP 2016-194049 filed in the Japan Patent Office on Sep. 30, 2016. Each of the above-referenced applications is hereby incorporated herein by reference in its entirety.

TECHNICAL FIELD

The present disclosure relates to a reflector, an information display apparatus, and a movable body.

BACKGROUND ART

There are an optical camouflage and a head-up display (Head-Up Display: HUD) as an apparatus that displays drive assist information such as a warning to a vehicle driver (see PTLs 1 to 7 below). The optical camouflage is a view aiding apparatus that improves driving safety by projecting an image of a background onto a region, such as a pillar, that is a blind spot for the driver. The HUD is a display apparatus that makes it possible to view an image and a background overlaid one on top of the other at a time by reflecting the image from a projector or the like on a combiner such as a half mirror provided at a windshield or the like.

CITATION LIST

Patent Literature

PTL 1: Japanese Unexamined Patent Application Publication No. 2005-199934
PTL 2: Japanese Unexamined Patent Application Publication No. 2013-171252
PTL 3: Japanese Unexamined Patent Application Publication No. H7-228172
PTL 4: Japanese Unexamined Patent Application Publication No. 2010-156929
PTL 5: Japanese Unexamined Patent Application Publication No. 2010-70117
PTL 6: Japanese Unexamined Patent Application Publication No. 2012-39397
PTL 7: Japanese Unexamined Patent Application Publication No. H7-156685

SUMMARY OF THE INVENTION

In an attempt to achieve monocular vision and multiple viewpoints using a reflector in an information display apparatus as described above, an installation location of a light projection unit such as a projector (hereinbelow, referred to as a "light projection unit") is significantly restricted. It is therefore desirable to provide a reflector, an information display apparatus, and a movable body that make it possible to relax the restriction on the installation location of the light projection unit.

A reflector according to an embodiment of the present disclosure includes a plurality of unit regions two-dimensionally arranged over a main surface. Each of the unit regions includes a plurality of reflecting surfaces two-dimensionally arranged, and splits a luminous flux entering the plurality of reflecting surfaces to perform reflection in a plurality of directions.

An information display apparatus according to an embodiment of the present disclosure includes a light projecting part that projects a luminous flux and a reflector that reflects the luminous flux from the light projecting part. The reflector has a plurality of unit regions two-dimensionally arranged over a main surface. Each of the unit regions includes a plurality of reflecting surfaces two-dimensionally arranged, and splits a luminous flux entering the plurality of reflecting surfaces to perform reflection in a plurality of directions.

A movable body according to an embodiment of the present disclosure includes a vehicle body and an information display apparatus mounted on the vehicle body. The information display apparatus provided at the movable body is the same component as the above-described information display apparatus.

In the reflector, the information display apparatus, and the movable body according to respective embodiments of the present disclosure, each of the unit regions two-dimensionally arranged over the main surface of the reflector is provided with a plurality of reflecting surfaces two-dimensionally arranged, and a luminous flux entering the plurality of reflecting surfaces is split and reflected in a plurality of directions. This makes it possible to achieve monocular vision and multiple viewpoints using the reflector by appropriately designing an angle of each of the reflecting surfaces in accordance with the installation location of the light projection unit. That is, there is no need of installing the light projection unit on the same axis as the reflector, thus allowing for more freedom for the installation location of the light projection unit.

In accordance with the reflector, the information display apparatus, and the movable body according to respective embodiments of the present disclosure, each of the unit regions two-dimensionally arranged over the main surface of the reflector is provided with the plurality of reflecting surfaces two-dimensionally arranged and the luminous flux entering the plurality of reflecting surfaces is split and reflected in a plurality of directions, thus making it possible to relax the restriction on the installation location of the light projection unit. It is to be noted that the effects of the present disclosure are not necessarily limited to the effects described here, and may be any of the effects described in the present specification.

BRIEF DESCRIPTION OF DRAWING

FIG. 1 illustrates a perspective configuration example of a movable body according to an embodiment of the present disclosure.
FIG. 2 illustrates an example of functional blocks of a projector in FIG. 1.
FIG. 3 illustrates a schematic configuration example of a light source in FIG. 2.
FIG. 4 illustrates the schematic configuration example of the light source in FIG. 2.
FIG. 5 illustrates a perspective configuration example of a reflector in FIG. 1.
FIG. 6 illustrates an example of workings of the reflector in FIG. 5.
FIG. 7 illustrates an example of workings of the reflector in FIG. 5.
FIG. 8 illustrates an example of workings of the reflector in FIG. 5.

FIG. 9 illustrates an example of a relation between a propagation distance of a partial luminous flux and a spot size in the reflector in FIG. 5.

FIG. 10 illustrates a perspective configuration example of the reflector in FIG. 1.

FIG. 11 illustrates an example of a displayed picture.

FIG. 12 illustrates a modification example of a perspective configuration of the movable body in FIG. 1.

FIG. 13 illustrates an example of a configuration of a reflector in FIG. 12.

FIG. 14 illustrates an example of workings of the reflector in FIG. 12.

FIG. 15 illustrates an example of the workings of the reflector in FIG. 12.

FIG. 16 illustrates a modification example of the perspective configuration of the movable body in FIG. 1.

FIG. 17 illustrates a modification example of the perspective configuration of the movable body in FIG. 1.

MODES FOR CARRYING OUT THE INVENTION

In the following, embodiments for carrying out the present disclosure are described in detail with reference to drawings. The following description is directed to specific examples of the present disclosure, and the present disclosure is not limited to the following embodiments. Moreover, the present disclosure is not limited to positions, dimensions, dimension ratios, and other factors of respective components illustrated in the drawings. It is to be noted that the description is given in the following order.

1. Embodiment (Movable Body)

An example in which a pillar is provided with a reflector

2. Modification Examples (Movable Body)

An example in which a dashboard is provided with a reflector

1. First Embodiment

[Configuration]

Described below is a configuration of a movable body 1 according to a first embodiment of the present disclosure. FIG. 1 illustrates a perspective configuration example of the movable body 1 according to the present embodiment. The movable body 1 includes an apparatus (an information display apparatus) that displays drive assist information for a driver 100 of a vehicle body 10. The movable body 1 includes, for example, the vehicle body 10 and the information display apparatus mounted on the vehicle body 10. The movable body 1 includes, for example, a projector 20 (a light projecting part), a reflector 30, a stereo camera 40, and a sensor 50, as the information display apparatus, for example.

(Stereo Camera 40, Sensor 50)

The stereo camera 40 is a camera that obtains a stereo picture 40A of the driver 100, and includes two monocular cameras 41, for example. The stereo camera 40 outputs the stereo picture 40A obtained by imaging to the projector 20. It is to be noted that, for example, a distance sensor or a structured light may be used instead of the stereo camera 40. The sensor 50 is a sensor that detects surrounding circumstances, and includes, for example, a laser radar, a stereo camera, a TOF distance sensor, or the like. The sensor 50 outputs a detection signal 50A obtained by detection to the projector 20.

(Projector 20)

FIG. 2 illustrates an example of functional blocks of the projector 20. The projector 20 performs image display in accordance with the laser scanning method. The projector 20 includes, for example, a light source 21, a light source driver 22, a MEMS mirror 23, a MEMS driver 24, a signal processing section 25 (a position detecting section and a circumstance detecting section), and an image processing section 26.

The signal processing section 25 determines whether or not there is a pedestrian behind a pillar 12, for example, on the basis of the detection signal 50A outputted from the sensor 50. In a case where there is a pedestrian behind the pillar 12, the signal processing section 25 outputs, to the image processing section 26, information about a position, a size, or the like of the pedestrian as a detection result (a first detection result). The signal processing section 25 further detects an eye of the driver 100, or a position of a site having a predetermined positional relation with the eye of the driver 100 (hereinbelow, referred to as a "position of the eye, etc. of the driver 100") out of the driver 100, on the basis of the stereo picture 40A outputted from the stereo camera 40. The signal processing section 25 outputs, as a detection result (a second detection result), the detected positional information to the image processing section 26.

The image processing section 26 generates drive assist information including, for example, information about the pedestrian behind the pillar 12 on the basis of the first detection result and the second detection result. The image processing section 26 further generates an image signal 22A and a timing signal 22B required for generating a luminous flux L1 including the generated drive assist information, and outputs the image signal 22A and the timing signal 22B to the light source driver 22. The image processing section 26 further generates a control signal 22C required for two-dimensionally scanning the luminous flux L1 with an irradiated surface (e.g., a surface of the reflector 30), and outputs the control signal 22C to the MEMS driver 24.

The light source driver 22 generates a signal voltage Vsig that drives the light source 21 on the basis of the image signal 22A and the timing signal 22B each inputted from the image processing section 26, and outputs the signal voltage Vsig to the light source 21. The light source 21 is driven by the signal voltage Vsig inputted from the light source driver 22 to project the luminous flux L1 toward the reflector 30 (actually, the MEMS mirror 23). That is, the light source 21 generates and projects the luminous flux L1 on the basis of the first detection result and the second detection result. The MEMS driver 24 generates a scanning signal Vscan that drives the MEMS mirror 23, on the basis of the control signal 22C inputted from the image processing section 26, and outputs the scanning signal Vscan to the MEMS mirror 23. The MEMS mirror 23 outputs the luminous flux L1 toward the reflector 30, and also two-dimensionally scans the surface of the reflector 30 with the luminous flux L1. The MEMS mirror 23 is driven by the scanning signal Vscan inputted from the MEMS driver 24 to perform scanning of the luminous flux L1.

FIG. 3 illustrates a schematic configuration example of the light source 21. The light source 21 includes, for example, a semiconductor laser device 211 operable to emit multiple types of color beams. The semiconductor laser device 211 is driven by the signal voltage Vsig inputted from the light source driver 22 to emit each color beam. The semiconductor laser device 211 includes, for example, a semiconductor laser (a red semiconductor laser) operable to emit red light, a semiconductor laser (a green semiconductor laser) operable to emit green light, and a semiconductor laser (a blue semiconductor laser) operable to emit blue light. Moreover, the semiconductor laser device 211 may be configured to emit one type of color beam, for example. The semiconductor laser device 211 may include, for example, one laser of the red semiconductor laser, the green semiconductor laser, and the blue semiconductor laser. Moreover, the semiconductor laser device 211 may be configured to emit two types of color beams, for example. The semiconductor laser device 211 may include, for example, two lasers of the red semiconductor laser, the green semiconductor laser, and the blue semiconductor laser. Moreover, the semiconductor laser device 211 may be configured to emit four or more types of color beams, for example. Moreover, the light source 21 may include a second harmonic generator (SHG) light source.

The light source 21 further includes, for example, a plurality of collimation lenses 212, a dichroic prism 213, and a mirror 214. The plurality of collimation lenses 212 are assigned to respective color beams of the semiconductor laser device 211 on a one-to-one basis to substantially parallelize (collimate) the respective color beams. The dichroic prism 213 combines respective color beams substantially parallelized by the plurality of collimation lenses 212 to convert to a single luminous flux L1. The mirror 214 reflects the luminous flux L1 generated by the dichroic prism 213 toward the MEMS mirror 23.

It is to be noted that, as illustrated in FIG. 4, for example, the semiconductor laser device 211 may emit monochromatic light. In that case, however, the dichroic prism 213 and the mirror 214 may be omitted. The projector 20 may employ a method of image display different from the laser scanning method. The projector 20 may employ image display based on a digital light processing (DLP) method, a liquid crystal on silicon (LCOS) method, or a liquid crystal display (LCD), for example.

(Reflector 30)

Next, description is given of the reflector 30. FIG. 5 illustrates a perspective configuration example of the reflector 30. The reflector 30 has a plurality of unit regions 30A two-dimensionally arranged over its main surface. Each unit region 30A is a region equivalent to a single pixel in a picture emitted by the projector 20, and has a size equivalent to a spot size of the luminous flux L1 emitted by the projector 20, for example. Each unit region 30A has a plurality of reflecting surfaces 31 that are two-dimensionally arranged, and splits the luminous flux L1 entering the plurality of reflecting surfaces 31 to perform reflection in a plurality of directions.

Each unit region 30A has, for example, as illustrated in FIG. 5, nine reflecting surfaces 31 divided into three different angles each in a vertical direction and a lateral direction. In this case, the luminous flux L1 is split into nine different partial luminous fluxes L2 having mutually different angular components. FIGS. 6, 7, and 8 illustrate examples of workings of the reflector 30. FIG. 6 illustrates an example of three partial luminous fluxes L2(1), L2(2), and L2(3) split in a horizontal direction when the luminous flux L1 enters one unit region 30A in the reflector 30 in FIG. 5. FIG. 7 illustrates a positional relation between the three partial luminous fluxes L2(1), L2(2), and L2(3) split in the horizontal direction and the driver 100. FIG. 8 illustrates an example of a relation between the three partial luminous fluxes L2(1), L2(2), and L2(3) split in the horizontal direction and eyes of the driver 100.

The plurality of reflecting surfaces 31 in the respective unit regions 30A are preferably configured to allow pitches D1 between the plurality of partial luminous fluxes L2(1), L2(2), and L2(3) to be equal to or larger than an interval between the eyes of a person (the driver 100) at a predetermined distance from the main surface of the reflector 30. It is to be noted that, hereinbelow, "predetermined distance" refers to a distance from the main surface of the reflector 30 to a location where the eyes of the driver 100 are located. In this manner, it is difficult for the partial luminous flux L2(1) to enter one eye of the driver 100 at the same time as the partial luminous flux L2(2) enters the other eye of the driver 100, for example. Furthermore, the plurality of reflecting surfaces 31 of each unit region 30A are preferably configured to allow a spot size D2 of each of the partial luminous fluxes L2(1), L2(2), and L2(3) to be equal to or smaller than the interval between the eyes of the person (the driver 100) at the predetermined distance from the main surface of the reflector 30. This prevents the partial luminous flux L2(1) from entering one eye of the driver 100 at the same time as the partial luminous flux L2(2) enters the other eye of the driver 100, for example.

Here, in a case where the size of each unit region 30A is set to 1 mm and each unit region 30A is divided into three each in the vertical and lateral directions, the size of one reflecting surface 31 with one angular component is 0.33 mm×0.33 mm. FIG. 9 illustrates an example of a relation between a propagation distance of the partial luminous flux L2 in the reflector 30 in FIG. 5 (a distance from the main surface of the reflector 30) and the spot size D2. FIG. 8 indicates a result at a time when a wavelength of the luminous flux L1 is the wavelength of green (530 nm) and each reflecting surface 31 has a flat plane. It is appreciated from FIG. 8 that, assuming the eye of the driver 100 is located at 500 mm from the main surface of the reflector 30, beam divergence by diffraction (the spot size D2) is about 1 mm. In this manner, when the spot size D2 is smaller than the size of the eye of the driver 100, the partial luminous flux L2 is more likely to deviate from the eye of the driver 100. Thus, the plurality of reflecting surfaces 31 of each unit region 30A are preferably configured to allow the spot size D2 of each of the partial luminous fluxes L2(1), L2(2), and L2(3) to be equal to or larger than the size of the eye of the person (the driver 100) at the predetermined distance from the main surface of the reflector 30 and also equal to or smaller than the interval between the eyes of the person (the driver 100). At this time, each reflecting surface 31 is preferably configured to allow a divergence angle θ2 of each of the partial luminous fluxes L2(1), L2(2), and L2(3) to be larger than a divergence angle θ1 of the luminous flux L1. Each reflecting surface 31 is preferably, for example, a scattering surface or a convex curved surface.

The plurality of reflecting surfaces 31 of each unit region 30A are preferably configured to allow as many viewpoints 300 to be formed at the predetermined distance from the main surface of the reflector 30 as the reflecting surfaces 31 included in each unit region 30A by a plurality of partial luminous fluxes L2 outputted from each unit region 30A. This makes it possible to obtain monocular images for multiple viewpoints, for example, because of one eye of the driver 100 being located at the viewpoints 300.

In a case where scattering occurs to the surface of each reflecting surface 31, an image is recognized by the driver 100 as a real image on the surface of the reflector 30. The image is projected only to one eye of the driver 100, and thus the image is recognized to be located at the same position as the background. Moreover, it is preferable that each reflecting surface 31 is designed so as not to be seen from a passenger in a passenger seat or the like other than the driver 100. This allows only the driver 100 to obtain necessary information and does not obstruct the passenger's view.

The reflector 30 is formed, for example, by plastic molded using a mold. The reflector 30 may be formed using a 3D printer, for example. The surface of the reflector 30 may be coated with a dielectric multilayer film or a metallic film used for controlling reflectance in accordance with its intended use. The ratio for dividing each unit region 30A may not be equal in the vertical direction and the lateral direction.

Each reflecting surface 31 may be two-dimensionally arranged without any gap over the main surface of the reflector 30, for example, as illustrated in FIG. 5. However, in the reflector 30, the entire main surface may not necessarily be the reflecting surface 31, but a portion thereof may be a diffusing surface. For example, as illustrated in FIG. 10, each unit region 30A may further include a diffusing surface 32 surrounding each reflecting surface 31. Isotropic scattering occurs to the diffusing surface 32. An amount of light entering the eye due to the isotropic scattering on the diffusing surface 32 is negligibly smaller than the amount of light entering the eye due to reflection by the reflecting surface 31. Thus, the diffusing surface 32 does not affect the image. Suppression of an unnecessary reflection component caused by external light, texture of the surface, and freedom of design are enhanced.

[Operation]

Next, description is given of an operation of the movable body 1 according to the present embodiment. In the present embodiment, firstly, for example, a pedestrian behind the pillar 12 is detected on the basis of the detection signal 50A outputted from the sensor 50. Furthermore, the position of the eyes of the driver 100 or the like are detected on the basis of the stereo picture 40A outputted from the stereo camera 40. Next, for example, the drive assist information including information, etc. about the pedestrian behind the pillar 12 is generated on the basis of, for example, information about the detected pedestrian and information about the position of the eye of the driver 100, or the like. Next, for example, the image signal 22A and the timing signal 22B required for generating the luminous flux L1 including the generated drive assist information are generated, and the signal voltage Vsig and the scanning signal Vscan that drive the light source 21 are generated on the basis of the image signal 22A and the timing signal 22B that are generated. Next, the light source 21 driven by the signal voltage Vsig and the scanning signal Vscan emits the luminous flux L1, and the emitted luminous flux L1 is scanned and reflected by the main surface of the reflector 30. Thus, in each unit region 30A, the luminous flux L1 is split into as many partial luminous fluxes L2 as the reflecting surfaces 31 included in each unit region 30A. Furthermore, the plurality of partial luminous fluxes L2 outputted from each unit region 30A form as many viewpoints 300 at the predetermined distance from the main surface of the reflector 30 as the reflecting surfaces 31 included in each unit region 30A. Each viewpoint 300 is generated near the eyes of the driver 100, thus, for example, an image as illustrated in FIG. 11 (image including a pedestrian 200) is visually recognized on the surface of the pillar 12, with the viewpoint 300 coming into one eye of the driver 100. At this time, the viewpoint 300 is located in only one eye of the driver 100, and thus the image on the surface of the pillar 12 is recognized to be at the same position as the background of the pillar 12. In this manner, the drive assist is performed for the driver 100.

Effects

Next, description is given of effects of the movable body 1 according to the present embodiment.

There are an optical camouflage and a head-up display (Head-Up Display: HUD) as an apparatus (an information display apparatus) that displays drive assist information such as a warning to a vehicle driver. The optical camouflage forms a retroreflecting surface in a pillar region, for example, and projects a background image from a direction closer to a line of sight of the driver using a projector (see, for example, Japanese Unexamined Patent Application Publication No. 2005-199934). At this time, the real image is displayed on a pillar part. Thus, when viewing a distant background through a windshield, the distant point is focused, and thus the image of the pillar is recognized as double images, which is indistinct. Therefore, there is proposed an apparatus that displays a virtual image corresponding to binocular parallax (see, for example, Japanese Unexamined Patent Application Publication No. 2013-171252). The invention described in this patent literature makes the system complex because it is necessary to reproduce an appropriate image corresponding to the binocular parallax. Moreover, the combiner is required and retroreflection is employed, which leads to a restriction on the installation location and designability due to the projector being disposed in a direction in proximity to a head of the driver. Furthermore, mismatch between accommodation and convergence is so large as to easily cause fatigue.

In contrast, in the case of the HUD, the image is displayed to both eyes of the driver. A depth position of the image displayed by the HUD is an optical virtual image position, which is set at a position 2 to 3 meters ahead of the driver in many cases. Accordingly, in the case of the binocular HUD, when the driver tries to view the display of the HUD while viewing a distant point, the display image of the HUD is recognized as double images, which is indistinct. To the contrary, when trying to view the display image of the HUD, the position 2 to 3 meters ahead is focused on, which makes it difficult to recognize a distant scenery at the same time. In a case where an image to be projected to both eyes is set at a distant point, the mismatch between accommodation and convergence is so large as to easily cause fatigue.

In order to solve such an issue resulting from the binocular parallax, there is proposed a monocular HUD used to observe the display image with one eye (see, for example, Japanese Unexamined Patent Application Publication No. H7-228172). When viewing the image with one eye, there are few clues to determine the depth, making it difficult for the brain to estimate the distance to the image. This makes the brain confused as if the picture is at the same position as the background scenery. It is thus recognized as if the displayed image is pasted on the background scenery. The monocular HUD has such issues that the position of the head allowing for monocular viewing is limited and that it is difficult to increase the screen size, because of its simple structure using a light shielding plate. To address the issue that the position of the head is limited, there is proposed a method of projecting an image to one eye by providing an eye position detecting section based on face recognition and adjusting a mirror angle in an optical path of the projector (see, for example, Japanese Unexamined Patent Application Publication No. 2010-156929). According to the invention described in this patent literature, the position of the eyeball is calculated on the basis of a face detection technique. Furthermore, the image is projected to one eye with high accuracy by directing infrared marker light toward the driver and adjusting the projection position of the projector on the basis of a relative position between the marker light and the eye position. There are also proposed a method of detecting an eye using a stereo camera (see, for example, Japanese Unexamined Patent Application Publication No. 2010-70117) and a method of detecting a head using two pairs of distance sensors (see, for example, Japanese Unexamined Patent Application Publication No. 2012-39397). These monocular HUDs project an image to one eye of the driver by reflecting a luminous flux converged by a concave lens in the optical path of the projector using a semi-transmissive reflecting body installed on the windshield. Although it is possible to form the reflecting body in a large region of the windshield, the projecting part below the windshield requires even larger area, which makes it difficult to install a large screen in such a limited region as the dashboard. Moreover, it is required to continue mechanically adjusting the mirror angle in accordance with the head position, thus making the system complex.

In addition, there is also proposed a method of installing, as a binocular HUD, a direct-view-type display apparatus that uses a parallax barrier or a lenticular lens over the dashboard (see, for example, Japanese Unexamined Patent Application Publication No. H7-156685). This method is suitable for increased screen size, but it is difficult to achieve a stereoscopic display apparatus having a curved surface shape as that of the dashboard. Thus, such restrictions emerge that the dashboard should have a flat shape or the screen should have a smaller size. Moreover, a HUD using the LCOS, for example, is slightly white-tinged even with a black signal, which becomes an issue when used in a dark environment such as when driving at night. Especially in a case where the screen size is large enough to occupy a larger proportion of the view, the image is focused on with the background scenery being blurred, which becomes an issue. To address this issue, a projector that employs the laser scanning method is used. The laser scanning method generates small tinge of white because of no light emission of the light source with the black signal. As described above, the optical camouflage on the pillar part and the HUD involve such an issue as the fatigue from the mismatch between accommodation and convergence and double images of display information due to binocular parallax when viewing a distant scenery during driving. To address this issue, there are a method in which information is recognized as if it is displayed in a position of the background by employing monocular vision and a method of displaying information to each eye according to the binocular parallax. For displaying such a degree of information as not to obstruct the view during driving, the system that displays binocular image becomes complex. A monocular system has an issue in either the designability or in the increased screen size because the multiple viewpoints corresponding to a plurality of head positions and a combiner are required. From those described above, there is not a suitable monocular HUD corresponding to the multiple viewpoints to achieve high designability and increased screen size.

In contrast, in the movable body 1 according to the present embodiment, each of the unit regions 30A two-dimensionally arranged over the main surface of the reflector 30 is provided with the plurality of reflecting surfaces 31, and the luminous flux L1 entering the plurality of reflecting surfaces 31 is split and reflected in a plurality of directions. This makes it possible to achieve the monocular vision and the multiple viewpoints using the reflector 30 by appropriately designing an angle of each reflecting surface 31 in accordance with the installation location of the light projector 20. That is, there is no need of installing the projector 20 on the same axis as the reflector 30, which allows for more freedom for the installation location and the design of the projector 20 or the reflector 30. Accordingly, it is possible to relax the restriction on the installation location and the design of the projector 20 or the reflector 30.

Moreover, in the movable body 1 according to the present embodiment, in a case where the plurality of reflecting surfaces 31 of each unit region 30A are configured to allow as many viewpoints 300 to be formed at the predetermined distance from the main surface of the reflector 30 as the reflecting surfaces 31 included in each unit region 30A by the plurality of partial luminous fluxes L2 outputted from each unit region 30A, for example, it is possible to position the viewpoint 300 in only one eye of the driver 100. Thus, it becomes possible to make the driver 100 recognize as if the image from the reflector 30 is displayed in a position of the background. As a result, it is possible to prevent a blurred scenery when the driver 100 focuses on the image on the reflector 30 and to prevent a blurred image on the reflector 30 when focusing on the scenery.

Moreover, in the movable body 1 according to the present embodiment, in a case where the plurality of reflecting surfaces 31 of each unit region 30A are configured to allow the pitches D1 between the plurality of partial luminous fluxes L2(1), L2(2), and L2(3) to be equal to or larger than the interval between the eyes of the person (the driver 100) at the predetermined distance from the main surface of the reflector 30, for example, the partial luminous flux L2(2) hardly enters one eye of the driver 100 at the same time as the partial luminous flux L2(1) enters the other eye of the driver 100. This makes it possible to make the driver 100 recognize as if the image on the reflector 30 is displayed at the position of the scenery. As a result, it is possible to prevent the blurred scenery when the driver 100 focuses on the image on the reflector 30 and to prevent the blurred image on the reflector 30 when focusing on the scenery.

Furthermore, in the movable body 1 according to the present embodiment, in a case where the plurality of reflecting surfaces 31 of each unit region 30A are configured to allow the spot size D2 of each of the partial luminous fluxes L2(1), L2(2), and L2(3) to be equal to or smaller than the interval between the eyes of the person (the driver 100) at the predetermined distance from the main surface of the reflector 30, for example, the partial luminous flux L2(1) is prevented from entering one eye of the driver 100 at the same time as the partial luminous flux L2(2) enters the other eye of the driver 100. This makes it possible to make the driver 100 recognize as if the image on the reflector 30 is displayed at the position of the scenery. As a result, it is possible to prevent the blurred scenery when the driver 100 focuses on the image on the reflector 30 and to prevent the blurred image on the reflector 30 when focusing on the scenery.

Moreover, in the movable body 1 according to the present embodiment, in a case where the plurality of reflecting surfaces 31 of each unit region 30A are configured to allow the spot size D2 of each of the partial luminous fluxes L2(1), L2(2), and L2(3) to be equal to or larger than the size of the eye of the person (the driver 100) at the predetermined distance from the main surface of the reflector 30 and also equal to or smaller than the interval between the eyes of the person (the driver 100), for example, not only the partial luminous flux L2(2) is prevented from entering one eye of the driver 100 at the same time as the partial luminous flux L2(1) enters the other eye of the driver 100, but also the partial luminous flux L2 hardly deviates from the eye of the driver 100. This makes it possible to make the driver 100 recognize as if the image on the reflector 30 is displayed constantly at the position of the background. As a result, it is possible to prevent the blurred scenery when the driver 100 focuses on the image on the reflector 30 and to prevent the blurred image on the reflector 30 when focusing on the scenery.

Moreover, in the movable body 1 according to the present embodiment, in a case where each reflecting surface 31 is configured to allow the divergence angle θ2 of each of the partial luminous fluxes L2(1), L2(2), and L2(3) to be larger than the divergence angle θ1 of the luminous flux L1, the partial luminous flux L2 hardly deviates from the eye of the driver 100. As a result, it is possible to view the picture constantly on the surface of the reflector 30.

Moreover, in the movable body 1 according to the present embodiment, in a case where the reflecting surfaces 31 are two-dimensionally arranged without any gap over the main surface of the diffuser 30, for example, it is possible to manufacture the diffuser 30 using a simple mold. As a result, it is possible to provide the diffuser 30 at a low cost.

Moreover, in the movable body 1 according to the present embodiment, in a case where each unit region 30A further includes the diffusing surface 32 surrounding each reflecting surface 31, isotropic scattering occurs on the diffusing surface 32. An amount of light entering the eye due to the isotropic scattering on the diffusing surface 32 is negligibly smaller than the amount of light entering the eye due to the reflection by the reflecting surface 31. Thus, the diffusing surface 32 does not affect the image. As a result, it is possible to suppress an unnecessary reflection component caused by the external light and to improve the texture of the surface and the freedom of design.

Moreover, in the present embodiment, in a case where the image is displayed on the reflector 30 by directly modulating the luminous flux L1 in accordance with scanning of the MEMS mirror 23, the semiconductor laser device 211 does not emit light with a black signal. Therefore, there is less possibility of degrading the background scenery due to white tinge. It is further possible to suppress power consumption of the projector 20. Moreover, in the present embodiment, in a case where collimated light is scanned, the projector 20 is focus-free, thus making it possible to cope with various shapes and arrangements of the reflector 30.

2. Modification Example

Next, description is given of a modification example of the movable body 1 according to the above-described embodiment.

In the above-described embodiment, as illustrated in FIG. 12, for example, the reflector 30 may be disposed on the dashboard 13 or may constitute a portion of the dashboard 13. In this case, the luminous flux L1 projected from the projector 20 is reflected in a direction of a windshield 11 by the reflector 30 that is on the dashboard 13 or constitute a portion of the dashboard 13. Subsequently, a component reflected again by the windshield 11 reaches one eye of the driver 100. Each reflecting surface 31 has an angle that reflects a three-dimensional shape of the windshield 11 and that takes into consideration the position of an eye of the driver 100, as illustrated in FIG. 13, for example. The angle of the reflecting surface 31 is small near the front of the driver 100, and the angle of the reflecting surface 31 becomes larger the farther away from the front of the driver 100.

FIG. 14 illustrates a positional relation between the three partial luminous fluxes L2(1), L2(2), and L2(3) split in the horizontal direction and the driver 100. FIG. 15 illustrates an example of a relation between the three partial luminous fluxes L2(1), L2(2), and L2(3) split in the horizontal direction and the eye of the driver 100.

The plurality of reflecting surfaces 31 of each unit region 30A are preferably configured to allow the pitches D1 between the plurality of partial luminous fluxes L2(1), L2(2), and L2(3) to be equal to or larger than the interval between the eyes of the person (the driver 100) at the predetermined distance from the main surface of the reflector 30 via the surface of the windshield 11. It is to be noted that, hereinbelow, "predetermined distance" refers to a distance from the main surface of the reflector 30 to the location where the eye of the driver 100 is present via the surface of the windshield 11. In this manner, for example, it is difficult for the partial luminous flux L2(1) to enter one eye of the driver 100 at the same time as the partial luminous flux L2(2) enters the other eye of the driver 100, for example. Furthermore, the plurality of reflecting surfaces 31 of each unit region 30A are preferably configured to allow a spot size D2 of each of the partial luminous fluxes L2(1), L2(2), and L2(3) to be equal to or smaller than the interval between the eyes of the person (the driver 100) at the predetermined distance from the main surface of the reflector 30 via the windshield 11. This prevents the partial luminous flux L2(1) from entering one eye of the driver 100 at the same time as the partial luminous flux L2(2) enters the other eye of the driver 100, for example.

In a large-screen HUD, an increased proportion of an image region of the HUD to the scenery during driving obstructs the view of the driver. It is therefore preferable that an area occupied by the display region in the windshield 11 should be in a range not exceeding 20%. The reflector 30 may be provided across the entire dashboard 13 as illustrated in FIG. 16, for example, or may be provided at a portion of the dashboard 13 (e.g., a right end of the dashboard 13) as illustrated in FIG. 17, for example. Even in a case where the reflector 30 is provided across the entire dashboard 13, only a less component of scattering light from the reflector 30 enters the eyes of the driver 100, because the reflection direction is controlled by the reflector 30. Thus, the view of the driver 100 is less obstructed compared to a case where a direct-view-type display is installed on the dashboard 13. Moreover, it is preferable that image should be invisible from the other people than the driver 100 through design not to obstruct the view of other people than the driver 100.

In the above-described embodiment, the reflector 30 may be provided, for example, at a location that is likely to be a blind spot for the driver 100 such as a back side of a door, a ceiling, and a seat of the vehicle body 10.

Although the present disclosure has been described hereinabove with reference to the embodiment and the modification example thereof, the present disclosure is not limited to the above-described embodiment, etc., and may be modified in a variety of ways. It is to be noted that the effects described herein are merely examples. The effects of the present disclosure are not limited to those described herein. The present disclosure may have effects other than those described herein.

Moreover, for example, the present disclosure may have the following configurations.

(1)

A reflector including a plurality of unit regions two-dimensionally arranged on a main surface, each of the unit regions including a plurality of reflecting surfaces two-dimensionally arranged, and splitting a luminous flux entering the plurality of reflecting surfaces to perform reflection in a plurality of directions.

(2)

The reflector according to (1), in which the plurality of reflecting surfaces in each of the unit regions are configured to allow as many viewpoints to be formed at a predetermined distance from the main surface as the reflecting surfaces included in each of the unit regions by a plurality of partial luminous fluxes outputted from each of the unit regions.

(3)

The reflector according to (1) or (2), in which the plurality of reflecting surfaces in each of the unit regions are configured to allow a pitch between the plurality of partial luminous fluxes after being split to be equal to or larger than an interval between eyes of a person at the predetermined distance from the main surface.

(4)

The reflector according to any one of (1) to (3), in which the plurality of reflecting surfaces in each of the unit regions are configured to allow a spot size of each of the partial luminous fluxes to be equal to or larger than a size of an eye of the person at the predetermined distance from the main surface.

(5)

The reflector according to any one of (1) to (4), in which each of the reflecting surfaces is configured to allow a divergence angle of the partial luminous flux to be larger than a divergence angle of the luminous flux.

(6)

The reflector according to any one of (1) to (5), in which the reflecting surfaces are two-dimensionally arranged without any gap therebetween over the main surface.

(7)

The reflector according to any one of (1) to (5), in which each of the unit regions further includes a diffusing surface surrounding each of the reflecting surfaces.

(8)

An information display apparatus including:
a light projecting part that projects a luminous flux; and
a reflector that reflects the luminous flux from the light projecting part,
the reflector including a plurality of unit regions two-dimensionally arranged over a main surface, and
each of the unit regions including a plurality of reflecting surfaces two-dimensionally arranged, and splitting the luminous flux entering the plurality of reflecting surfaces to perform reflection in a plurality of directions.

(9)

The information display apparatus according to (8), in which
the light projecting part includes
a position detecting section that detects an eye of an observer, or a position, of the observer, of a site having a predetermined positional relation with the eye and outputs a first detection result,
a circumstance detecting section that detects a surrounding circumstance and outputs a second detection result, and
a light source that generates and projects the luminous flux on the basis of the first detection result and the second detection result.

(10)

A movable body including:
a vehicle body; and
an information display apparatus mounted on the vehicle body,
the information display apparatus including
a light projecting part that projects a luminous flux, and
a reflector that reflects the luminous flux from the light projecting part,
the reflector including a plurality of unit regions two-dimensionally arranged over a main surface, and
each of the unit regions including a plurality of reflecting surfaces two-dimensionally arranged, and splitting the luminous flux entering the plurality of reflecting surfaces to perform reflection in a plurality of directions.

This application claims the priority of Japanese Priority Patent Application JP2016-194049 filed with the Japanese Patent Office on Sep. 30, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A reflector, comprising
a plurality of unit regions two-dimensionally arranged on a main surface, wherein
each unit region of the unit regions includes a plurality of reflecting surfaces two-dimensionally arranged, and
the plurality of reflecting surfaces is configured to:
split a luminous flux that enters the plurality of reflecting surfaces;
reflect the luminous flux in a plurality of directions;
output a plurality of partial luminous fluxes from each unit region of the plurality of unit regions; and
allow as many viewpoints to be formed at a determined distance from the main surface as the plurality of reflecting surfaces included in each unit region of the unit regions, wherein the viewpoints are formed based on the outputted plurality of partial luminous fluxes.

2. The reflector according to claim 1, wherein the plurality of reflecting surfaces in each unit region of the plurality of unit regions is further configured to allow a pitch between the plurality of partial luminous fluxes to be equal to or larger than an interval between eyes of a person at the determined distance from the main surface.

3. The reflector according to claim 2, wherein the plurality of reflecting surfaces in each unit region of the unit regions is further configured to allow a spot size of each partial luminous flux of the partial luminous fluxes to be equal to or larger than a size of an eye of the person at the determined distance from the main surface.

4. The reflector according to claim 1, wherein each reflecting surface of the plurality of reflecting surfaces is further configured to allow a divergence angle of each partial luminous flux of the plurality of partial luminous fluxes to be larger than a divergence angle of the luminous flux.

5. The reflector according to claim 1, wherein the plurality of reflecting surfaces are two-dimensionally arranged over the main surface without any gap therebetween.

6. The reflector according to claim 1, wherein each unit region of the plurality of unit regions further includes a diffusing surface surrounding each reflecting surface of the plurality of reflecting surfaces.

7. An information display apparatus, comprising:
a light projector configured to project a luminous flux; and
a reflector configured to reflect the luminous flux projected from the light projector, wherein
the reflector includes a plurality of unit regions two-dimensionally arranged over a main surface, each unit region of the unit regions includes a plurality of reflecting surfaces two-dimensionally arranged, and the plurality of reflecting surfaces are configured to:
split the luminous flux that enters the plurality of reflecting surfaces; and
reflect the luminous flux in a plurality of directions.

8. The information display apparatus according to claim 7, further comprising:
a position detecting section configured to:
detect an observer's eye or a position of a site having a determined positional relation with the observer's eye; and
output a first detection result based on the detection; and
a circumstance detecting section configured to:
detect a surrounding circumstance; and
output a second detection result based on the detection of the surrounding circumstance, wherein
the light projector is further configured to generate and project the luminous flux based on the first detection result and the second detection result.

9. A movable body, comprising:
a vehicle body; and
an information display apparatus mounted on the vehicle body, wherein the information display apparatus includes:
a light projector configured to project a luminous flux; and
a reflector configured to reflect the luminous flux projected from the light projector, wherein
the reflector includes a plurality of unit regions two-dimensionally arranged over a main surface,
each unit region of the unit regions includes a plurality of reflecting surfaces two-dimensionally arranged, and
the plurality of reflecting surfaces are configured to:
split the luminous flux that enters the plurality of reflecting surfaces; and
reflect the luminous flux in a plurality of directions.

* * * * *